United States Patent [19]

Midgley et al.

[11] 4,179,320

[45] Dec. 18, 1979

[54] RECOVERABLE ARTICLES

[75] Inventors: John A. Midgley, San Carlos; David D. Nyberg, Sunnyvale, both of Calif.

[73] Assignee: Raychem Corporation, Menlo Park, Calif.

[21] Appl. No.: 895,064

[22] Filed: Apr. 10, 1978

[51] Int. Cl.$^2$ .................. B32B 31/00; F16L 11/00; B29C 13/00; B29C 27/00
[52] U.S. Cl. ........................................ 156/86; 156/85; 156/344; 138/119; 138/140; 138/DIG. 5; 174/DIG. 8; 264/230; 285/381; 403/273; 428/36; 428/43; 428/212; 428/913
[58] Field of Search ............. 428/35, 36, 43, 212, 428/913; 264/25, 249, 230; 156/84, 85, 86, 344; 403/273, 28, 29, 30; 285/381; 138/96 R, 89, 95, 140, 119, DIG. 5; 174/74 A, DIG. 8

[56] References Cited

U.S. PATENT DOCUMENTS

| | | | |
|---|---|---|---|
| 3,515,798 | 6/1970 | Sievert | 174/DIG. 8 |
| 3,669,824 | 6/1972 | Hess | 174/DIG. 8 |
| 3,824,331 | 7/1974 | Mixon et al. | 174/DIG. 8 |
| 4,035,534 | 7/1977 | Nyberg | 174/DIG. 8 |
| 4,070,746 | 1/1978 | Evans et al. | 156/344 |

Primary Examiner—William R. Dixon, Jr.
Attorney, Agent, or Firm—Lyon & Lyon

[57] ABSTRACT

Flexible hollow articles comprise an expanded elastomeric inner member and an outer restraining means. The restraining means has score lines thereon, and is made of a notch-sensitive material so that the score lines can be propagated through the material by distorting the article. The stiffness and elongation of the restraining means, and the peel strength of the bond between the inner member and the restraining means, are so chosen that at least part of the restraining means can be pulled away from the inner member by manual force. The articles are useful for covering substrates, especially splices and terminations in electrical cables.

50 Claims, 13 Drawing Figures

FIG_1

FIG_2

FIG_3

FIG_4A

FIG_4B

FIG_5

FIG_4C

FIG_4D

FIG_6

FIG_4E

FIG_7

FIG_8

FIG_9

RECOVERABLE ARTICLES

CROSS-REFERENCE TO RELATED APPLICATION

A preferred method for making the articles of the present invention is disclosed and claimed in the commonly assigned and contemporaneously filed application by Hubert K. Franz entitled "Method of making laminated recoverable articles", Ser. No. 895,069, filed on Apr. 10, 1978.

BACKGROUND OF THE INVENTION

1. Field of the Invention

This invention relates to recoverable hollow articles comprising an inner member which is composed of an elastomeric material and which has been elastically deformed from its natural dimensions to a radially extended condition, and an outer restraining means which maintains the inner member in its extended condition but which can be treated to permit the inner member to recover towards its natural dimensions.

2. Summary of the Prior Art

French Patent Application No. 7,618,236 and the corresponding U.S. Pat. No. 4,070,746 (Evans et al. to Raychem) and copending U.S. application Ser. No. 586,901 (Krackeler et al. to Raychem) filed June 16, 1975, the disclosures of which are incorporated by reference herein, describe recoverable hollow artiles comprising an inner member, preferably of an elastomeric material, which is held in a radially extended condition by an outer restraining means, the inner member and the restraining means being secured together by means of a bond which can be broken to allow the inner member to shrink radially. Preferably the restraining means is capable of being peeled away from the inner member; the peeling process can be assisted by applying a solvent to the bond line. The restraining means may be composed of a frangible material which can be broken by means of a sharp blow, for example a rigid thermoplastic such as polyvinyl chloride. Alternatively the restraining means can have weakened portions such as score lines which enable it to be peeled away from the inner member, as for example a metallic tube which is spirally scored or serrated. The recoverable articles are useful for covering substrates, especially splices and terminations in electrical cables, e.g. mine cables.

SUMMARY OF THE INVENTION

In the course of further development work based on the invention described above, we observed that if an article as generally described above could be modified so that it was sufficiently flexible to permit its cross section to be deformed without breaking the bond between the elastomeric inner member and the restraining means, this would be very valuable when the article was used to cover a substrate having a cross-section different from the cross-section of the article. For example, manufacturing considerations usually make it preferable for such articles to have a substantially round cross-section. On the other hand the substrates to be covered are not necessarily round in cross section; for example mine cables are generally oval, and cable splices may be of irregular configuration. If the article has a cross-section which can be deformed, e.g. from a round cross-section to an oval cross-section, this makes it possible to change the cross-section of the article while it is being positioned around the substrate, before recovery of the inner member, and thus reduces the expansion ratio required for the inner member when a substrate of different cross-section is to be covered. A reduction in expansion ratio is desirable for two reasons. Firstly, it reduces the force required to maintain the inner member in a deformed condition. Secondly, it reduces the danger that the inner member will suffer from "tension set" (i.e. non-recoverable radial deformation) on storage.

We have now discovered that by proper correlation of the properties of the restraining means and the strength of the bond between the restraining means and the inner member, there can be obtained flexible shrinkable hollow articles of outstanding utility. In particular we have discovered that by making the restraining means from a material whose stiffness, elongation and notch sensitivity are within particular ranges, and by providing on the outer surface of the restraining means one or more score lines which extend part of the way through the thickness of the restraining means, there is obtained a flexible article which can be distorted so that the depth of the score line or at least one of the score lines is substantially increased, to provide an area of the restraining means which, when the bond strength is in an appropriate range, can be pulled away from the inner member by manual (or equivalent) force, if desired with the aid of solvent applied to the bond line. The term "solvent" is used herein to denote any fluid which will substantially weaken the forces securing the inner member to the restraining means. The term "score line" is used herein to denote any indentation in the form of a line.

In one aspect, the present invention provides a flexible, shrinkable, hollow article which comprises
(1) a hollow inner member which is composed of an elastomeric material and which is in a radially extended condition; and
(2) a hollow outer restraining means
   (a) whose inner surface is secured to the outer surface of said inner member and which maintains said inner member in said radially extended condition, said inner and outer surfaces being secured to each other by a bond whose peel strength is less than 50, preferably 4 to 30, lb. per linear inch width (pli) at 21° C;
   (b) whose outer surface forms the outer surface of said article and is provided with at least one score line whose depth is 5 to 90% of the thickness of the restraining means; and
   (c) is composed of a material which
      (i) has a 2% secant modulus at 21° C. of 4,000 to 120,000 psi;
      (ii) has an ultimate elongation at 21° C. of at least 20% at a separation speed of 200% per minute and of at most 150% at a separation speed of 2000% per minute; and
      (iii) has a notch sensitivity such that by distorting the article so as to exert a bending moment about the axis of a score line, the depth of said score line can be substantially increased to provide at least one section of the restraining means which can be pulled away from the inner member by manual (or equivalent) force, if desired with the aid of a solvent applied to the bond line.

The invention also provides a method of covering a substrate which comprises (1) distorting an article as defined above to cause the depth of at least one of the score lines to increase substantially;
(2) placing the article around a substrate to be covered; and
(3) peeling at least part of the restraining means away from the inner member to cause recovery of the inner member around the substrate, said peeling being initiated by pulling away from said inner member a section of said restraining means adjacent a said score line whose depth has been increased in step (1).

Step (1) of this process is generally, but not necessarily, carried out before step (2). The initiation of peeling by pulling away a section of the restraining means is usually carried out after step (2), immediately before the inner member is caused to recover. However, it can be carried out before step (2) provided that premature recovery of the inner member is not thereby caused to occur.

The invention also provides a method of making an article as defined above which comprises
(1) radially extending a hollow member composed of an elastomeric material;
(2) bonding the outer surface of said radially extended member to the inner surface of a restraining means to provide a bond between said inner and outer surfaces whose peel strength is less than 50 pli at 21° C.; and
(3) scoring the outer surface of said restraining means to provide thereon at least one score line whose depth is 5 to 90% of the thickness of the restraining means;
said restaining means being composed of a material which
(i) has a 2% secant modulus at 21° C. of 4,000 to 120,000 psi;
(ii) has an ultimate elongation at 21° C. of at least 20% at a separation speed of 200% per minute and at most 150% at a separation speed of 2,000% per minute; and
(iii) has a notch sensitivity such that, by distorting the article so as to exert a bending moment about the axis of a score line, the depth of said score line can be substantially increased.

BRIEF DESCRIPTION OF THE DRAWINGS

The invention is illustrated in the accompanying drawings, in which.

DETAILED DESCRIPTION OF THE INVENTION

In describing the invention, reference is made to a number of physical properties. These properties are measured as set out below.

Ultimate Elongation is measured, at the indicated temperature, by the method of ASTM D412-75 using dumb bell specimens (Die D) and 1 inch bench marks, the separation speed being 2 inch per minute for measurement at a separation speed of 200% per minute and 20 inch per minute for measurement at a separation speed of 2,000% per minute.

2% Secant Modulus is measured, at the indicated temperature, by the method of ASTM D638-72 using a 0.5 inch wide straight specimen, a cross-head speed of 0.5 inch per minute, a jaw separation of 5 inch and a chart speed of 20 inch per minute.

Figure 6:
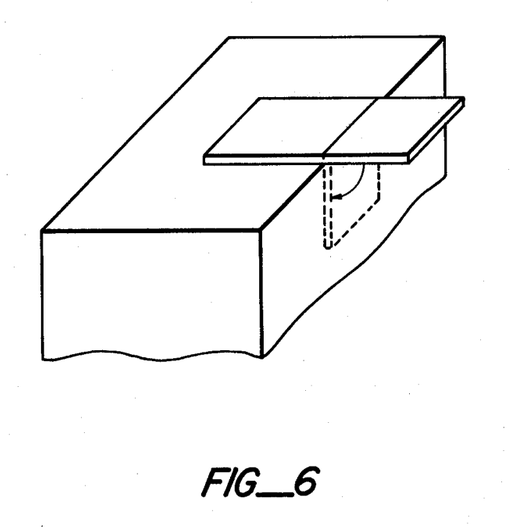
FIG. 6 is an isometric view of part of a procedure for measuring notch sensitivity.

% Torn Depth is measured at 21° C. by the notch sensitivity test described below. A rectangular strip of the material, preferably 1 inch wide and 0.075 ($\pm$0.005) inch thick, is used as a test specimen. A cut whose depth is 0.1 to 0.2 times the thickness of the specimen (e.g. 0.008 inch for the preferred specimen) is made with a razor blade across the strip at right angles to the axis of the strip. As illustrated in FIG. 6, the strip is then placed on a block having a right-angled edge, with the cut on the upper surface directly above the edge of the block, and bent through an angle of 90° over the edge of the block. The cut is propagated, to a greater or lesser extent, by cracking of the material along the bending line. The strip is then divided into two parts by severing with a razor blade any remaining material along the bending line. Under suitable magnification, the areas of the exposed edge which have been cut by the razor blade can be clearly distinguished from the area which has been torn by bending, and the average depth of the torn area can be measured. The % Torn Depth is equal to $$100 \times \frac{\text{Average depth of torn area}}{\text{Thickness of specimen} - \text{depth of original cut}}$$

In order to make the measurements described above, it will usually be preferable to prepare test specimens from the material in bulk or in some convenient shaped form. If it is desired to make the measurements on material which is already in the form of a restraining means, it may be possible, for at least some of the measurements, to use test specimens cut from the article, after removal of the inner member and adhesive from the specimen. In other cases, the material should be identified and specimens prepared from the material in bulk or in some convenient shaped form.

Peel Strength of the bond between the inner member and the restraining means is measured at the indicated temperature by the following procedure.

A rectangular specimen free from score lines is cut from the article. With the aid of solvent applied to one end of the specimen, the inner member is separated from the restraining means over a limited distance. After evaporation of the solvent, the separated end of the inner member is placed in one jaw of an Instron Tester and the separated end of the restraining means is placed in the other jaw. The peel strength is determined at a jaw separation speed of 2 inches per minute, taking the average of the highest and lowest values. For peel strengths at 49° C., the specimen is stored at 49° C. and then placed in the 49° hot box of an Instron, and the whole apparatus is allowed to come to equilibrium for three minutes before the peel strength is determined.

Ideally the specimens used should be 1 inch wide. If suitable specimens cannot be cut from the article, or for the purpose of determining whether satisfactory articles can be prepared from a particular combination of inner member, adhesive and restraining means, it is often possible to obtain substantially equivalent peel strengths from a specimen prepared by bonding together under heat and pressure a sandwich of (a) an unstretched sheet of the elastomeric material of the inner member;
(b) a layer of the hot melt adhesive; and
(c) a sheet of the material of the restraining means.

The articles of the present invention are generally of tubular configuration, preferably of circular cross-section, and the invention will be described chiefly by reference to such articles. It is to be understood, however, that the invention includes end caps and other more complex hollow configurations having one or more open ends through which a substrate can be inserted. It is also to be understood that the invention includes articles which include one or more portions which do not comprise a said inner member and restraining means, for example an article having a rigid tubular or T-shaped or Y-shaped central portion and two or more end portions, each of which comprises a said inner member and restraining means.

The end result achieved by the present invention is a substrate covered by the inner member, after it has elastically recovered towards the substrate following removal of at least part of the restraining means. The elastomeric material of the inner member should therefore be selected with the end use in mind, for example as electrical insulation. In articles for insulating splices in mine cables, we have obtained excellent results using formulations based on commercially available polychloroprenes ("Neoprene"). Other suitable elastomeric materials are disclosed in U.S. Pat. No. 4,070,746. Materials having low tension set are preferred. Part or all of the inner surface of the inner member may be coated with a material which will improve the sealing and/or adhesion of the member to the substrate, for example a mastic or a pressure-sensitive adhesive. The thickness of the inner member, when fully recovered, is usually in the range 0.02 to 0.25 inch, preferably 0.05 to 0.15 inch, but greater thicknesses, e.g. up to 0.5 inch, may be useful in certain circumstances. For covering electrical cables, the internal diameter of the inner member will usually be from 0.1 to 3 inch, preferably 0.4 to 2 inch, when fully recovered, and from 0.125 to 4 inch, preferably 0.75 to 3 inch, in the extended state. For covering other substrates, such as pipes and ducts these or larger diameters may be used. The extension ratio of the inner member (i.e. the ratio of the extended diameter to the fully recovered diameter) will usually be 1.3:1 to 3:1, preferably 1.7:1 to 2.3:1. An increase in the thickness or extension of the inner member or the modulus of the elastomeric material will increase the retractive force of the inner member.

The inner member will normally be bonded to the restraining means through a layer of adhesive, preferably a hot-melt adhesive. Suitable adhesives are disclosed in U.S. Pat. No. 4,070,746. The peel strength of the bond at 21° C. should be less than 50 pli. Since on the one hand the inner member should not separate from the restraining means under normal storage conditions and on the other hand it must be possible to initiate peeling by pulling a section of the restraining means away from the inner member by manual or equivalent force, it is preferred that the peel strength of the bond at 21° C. should be 4 to 30 pli, particularly 5 to 25 pli, especially 7 to 15 pli. In order to avoid the need for storage under controlled temperature conditions, it is preferred that the peel strength at 49° C. should be at least 2 pli, especially at least 4 pli.

The restraining means must be sufficiently stiff that it will not undergo buckling which will interfere with use of the article, and it is this which gives rise to the requirement that the material of the restraining means has a 2% secant modulus at 21° C. of at least 4,000 psi, preferably at least 13,000 psi. On the other hand, the article must be sufficiently flexible that its cross-section can be deformed without undue force (and preferably by hand) and it must be possible for peeling to be initiated by pulling a section of the restraining means from the inner member. These constraints give rise to the requirement that the material have a 2% secant modulus at 21° C. of at most 120,000 psi. Preferably the material has a 2% secant modulus at 21° C. of 15,000 to 100,000, especially 15,000 to 40,000 psi. In order to avoid the need for storage under controlled conditions, it is preferred that the material have a 2% secant modulus at 49° C. of at least 4,000 psi. The thicker the restraining means and the lower the retractive force of the inner member, the lower the secant modulus of the material which will give satisfactory results.

The requirements for ultimate elongation at 21° C. are also related to the peelability of the restraining means, since it is necessary that the section which is pulled away to initiate peeling should bend without cracking through a sufficiently large angle (generally 90° to 180°) to apply the pulling force, but should not be stretched excessively by the pulling force. The ultimate elongation of the material at 21° C. and at a separation speed of 200% per minute is preferably at least 25%, particularly at least 35%, especially at least 50%, and preferably does not exceed 120%, especially 100%.

The last requirement for the material of the restraining means is that it should be sufficiently notch sensitive that, by distorting the article so as to exert a bending moment about the axis of the score line, the depth of the score line or lines can be substantially increased. Preferably the notch sensitivity is such that by distorting the article the score line or lines can be propagated through the restraining means so that the depth of the score line becomes at least 50%, preferably at least 80%, especially at least 90%, of the thickness of the restraining means. In making articles having an outer restraining means and a radially extended elastomeric inner member, it is impossible to score completely through the restraining means without danger of damaging the inner member. Both manufacturing tolerances and storage requirements make it desirable that the score line should have a depth which is less than 75%, preferably less than 50%, especially less than 25%, of the thickness of the restraining means, and that the thickness of the restraining means remaining underneath the score line should be at least 0.010 inch, particularly at least 0.020 inch, especially at least 0.040 inch. On the other hand, the shallower the score line, the more difficult it is to peel the restraining means from the inner member. An important factor in the present invention was the realisation that these antipathic facts could be reconciled by making relatively shallow scores in a restraining means composed of a notch-sensitive material. The "% Torn Depth" referred to above is a measure of the notch sensitivity of the material, and is preferably at least 40%, especially at least 50%.

We have found that when the 2% secant modulus at 21° C. is less than 40,000 psi, e.g. 15,000 to 40,000 psi, the values of the 2% secant modulus at 21° C. (S), the ultimate elongation at 21° C. (E), the % torn depth (T) and the peel strength at 21° C. (P) are such that the term $$T - 0.002S + 0.054E + 0.54P$$

(where S is in psi and P is in pli) is preferably 10 to 60, especially 15 to 35.

The material for the restraining means should be selected with a view to the above requirements and preferences, including of course the requirement that the material must bond adequately to the adhesive. Preferably the material comprises an organic polymer. Synthetic organic polymers are preferred, but materials based on natural or modified natural polymers, e.g. cellulosic polymers and polymeric mixtures derived from unsaturated oils, can also be used. Suitable materials may comprise a mixture of two or more polymers, which differ substantially in modulus, elongation or bondability to the adhesive, or two or all of these. For example the material may comprise a mixture of two polymers, one polymer having relatively high modulus (e.g. greater than 5,000 psi, preferably greater than 7,000 psi) and/or a relatively low elongation (e.g. less than 100%, preferably less than 50%), and the other polymer having a relatively low modulus, e.g. less than 5,000 psi, and/or a relatively high elongation (e.g. greater than 100%, preferably greater than 150%), the ratio by weight of the first polymer to the second polymer generally being from 1.5:1 to 4:1, preferably 2:1 to 3:1. When the adhesive is a polar material, as it usually will be when a polar rubber such as polychloroprene is used for the inner member, one or both of the polymers will usually be a polar polymer. When the adhesive is non-polar, the material of the restraining means will normally be non-polar also or at least comprise a major proportion (by weight based on the polymeric materials) of a non-polar polymer. Suitable mixtures of polymers include mixtures of block copolymers containing polyester blocks and polyether blocks, for example a polytetramethylene ether/polytetramethylene terephthalate block copolymer (e.g. the "Hytrel" and "Dyvax" polymers sold by du Pont), and a low modulus copolymer of at least one olefin, especially ethylene, and at least one polar comonomer, especially a vinyl ester of an alkyl carboxylic acid, e.g. vinyl acetate, or an alkyl ester of acrylic or methacrylic acid, e.g. ethyl acrylate. Another suitable mixture of polymers is a blend of polyvinylchloride and a rubbery chlorinted polyethylene. The material may also comprise at least one component which will increase the notch sensitivity of the material. For example the composition may comprise, an appropriate proportion, e.g. 25 to 75%, preferably 50 to 65%, by weight of a particulate filler, usually of the non-reinforcing type, e.g. an inorganic filler such as calcium carbonate, amorphous silica or a silicate such as clay. Generally the greater the amount of such fillers, the lower the strength of bonds formed between the material and hot melt adhesives. Alternatively or additionally the composition may comprise a low molecular component of low compatibility, such as a wax or a plasticiser, which reduces the peel strength of bonds formed between the material and hot melt adhesives. The material can, and often will, contain other ingredients such as antioxidants, flame retardants, pigments and extrusion aids.

Preferably the material of the restraining means is thermoplastic, so that it can be melt-shaped to a desired configuration, especially melt-extruded as a tube which is later cut to the desired length. The material can be crosslinked in order to give it a desired combination of properties.

The bonding of the inner member to the restraining means can be effected in any way which will give the required bond strength. Preferably, however, the method employed is that described in the commonly assigned and contemporaneously filed application by Hubert K. Franz, entitled "Method of making laminated recoverable articles", the disclosure of which is hereby incorporated by reference. Although reference is made herein to the fact that the inner member is radially extended, it should be noted that the method of manufacture will generally cause the inner member to have axial as well as radial retraction forces. This fact is of practical importance since it means that the recovery forces of the inner member tend to peel it away from the restraining member at the ends. This increases the bond strength which is needed to ensure that the article does not recover prematurely, and frequently makes it desirable to insert end plugs into the article for storage purposes, in order to take the end sections of the inner member out of peel, especially when the peel strength is less than 4 pli.

The configuration of the score lines on the article can vary widely. In many cases it will be desirable for the score line or lines to extend to at least one end of the article, so that peeling can commence at the end of the article. Especially in this case, the restraining means is preferably longer than the inner member and is bonded to the inner member so that it has an overlapping lip at one end, and preferably at both ends, of the article. The presence of such a lip is desirable because it provides an area of the restraining means which can readily be grasped by the operator, either with his hand or with a suitable tool, to commence peeling of the restraining means from the inner member. The lip is preferably at least 0.25 inch long, e.g. 0.5 to 1.0 inch long. It is not, however, necessary for the score line(s) to extend to an end of the restraining means, provided that, after they have been cracked open, they provide an area which can be pulled away from the restraining means. Especially in this case, the area at which peeling is commenced preferably comprises a protruberance which can be grasped by the operator to initiate peeling.

In one embodiment, a plurality of straight, parallel score lines run from end to end of the article, the distance between the score lines being for example 0.2 to 1 inch, preferably 0.4 to 0.75 inch. Using such score lines, peeling of the restraining means may be possible by pulling off the restraining means in strips without the use of any solvent at all, or only sufficient solvent to loosen the bond in the region where peeling begins. In a functionally similar embodiment, one or more score lines run spirally around the article. In a further embodiment the score line or lines are confined to a limited area, which may be at one or both ends of the article or at an intermediate point thereof, and the function of the score lines is then not to permit the whole of the restraining means to be pulled away from the inner member, but rather to allow part of the restraining means to be pulled away and thus provide an area to which solvent can be applied and from which the solvent can propagate along the bond line, so that peeling is mainly effected by elastic recovery forces pulling the inner member away from the weakened bond line. We have found that recovery of the inner member can be effected surprisingly rapidly in this way, especially when the article is placed so that the solvent can run downwards through the bond line and the article is kneaded during this process to promote spreading out of the solvent. When the inner member has recovered, it is generally desirable to remove the restraining means, taking care not to damage the inner member. Good use can be made of the notch-sensitive character of the restraining means, since it is necessary only to score roughly along the outer surface of the restraining means, which can then be cracked open and removed.

The score lines can be made by cutting into the surface of the restraining means with a sharp blade, or they can be formed at the time the restraining means is manufactured, e.g. by extrusion or molding.

The score lines can be cracked open by any distortion of the article which will exert a bending moment about the axis of the score line, for example by crushing the article. Although it is preferred that all the score lines should be cracked open, this is not essential providing that the extent of the cracking is sufficient to allow satisfactory peeling.

The articles of the invention and their use are illustrated in FIGS. 1 to 5, and 7 to 9 of the accompanying drawings.

Figure 1:
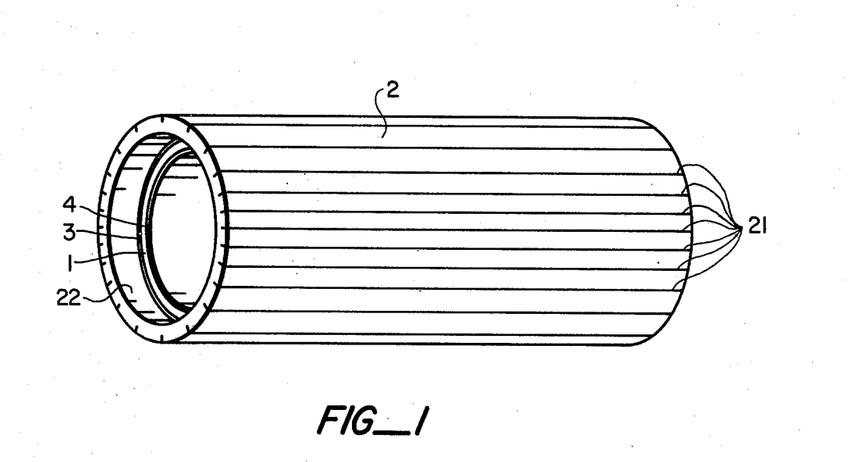
FIG. 1 is an isometric view of an article of the invention.

FIG. 1 illustrates an article of the invention which comprises inner member 1 which is secured to restraining means 2 by an adhesive layer 3 and is coated internally with mastic layer 4. Score lines 21 run from end to end of restraining means 2 and have a depth about 20% of the thickness of restraining means 2. The restraining means 2 is longer than the inner member 1, providing a lip 22 at the left hand end. Preferably there is a similar lip at the other end, but the inner member 1 can be flush with the restraining means 2 at the other end.

Figure 2:
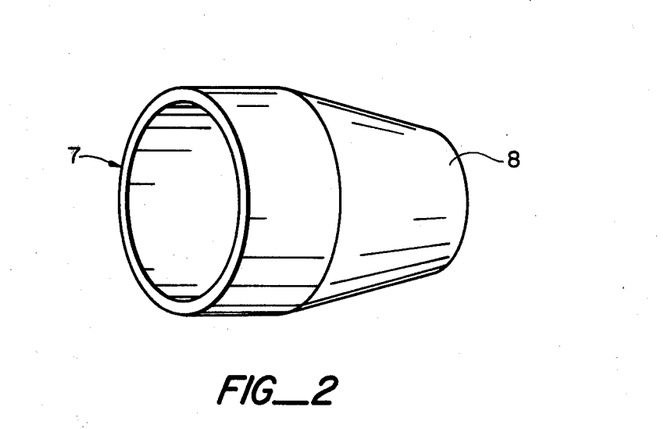
FIG. 2 is an isometric view of an end plug for use during storage of an article of the invention.

FIG. 2 illustrates an end plug 7 having a truncated cone portion 8 whose diameter and angle of taper are such that for storage purposes a plug as illustrated can be placed in each end of the recoverable article to take the inner member out of peel.

Figure 3:
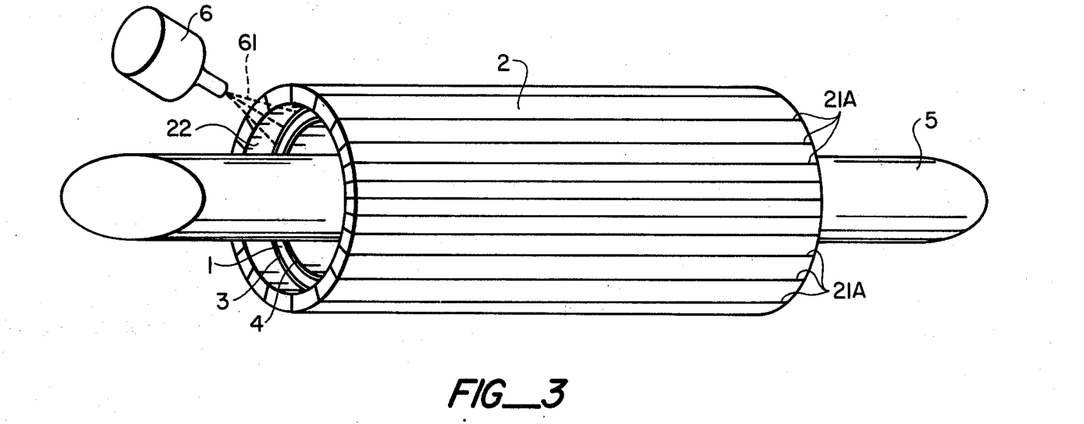
FIG. 3 is an isometric view of an article of the invention placed around a substrate, immediately before the restraining means is peeled off.
Figure 4A:
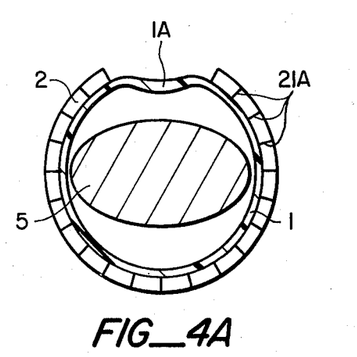
FIGS. 4A to 4E are cross-sectional views of the article during successive stages of the process of peeling off the restraining means.
Figure 4B:
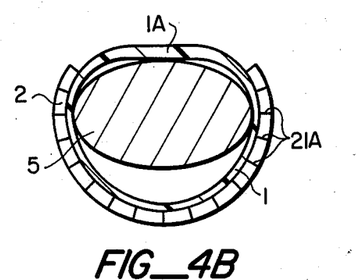
Figure 4C:
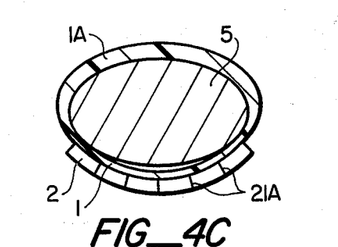
Figure 4D:
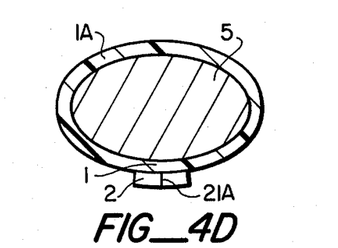
Figure 4E:
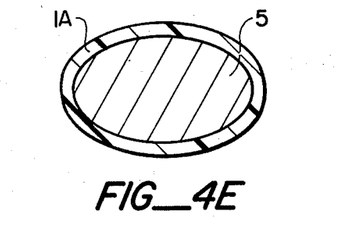

FIG. 3 illustrates the article of FIG. 1 which has been distorted so that score lines 21 have propagated through the restraining means 2, becoming cracks 21A, and which has then been placed about a substrate 5 of oval cross-section. Solvent 61 is sprayed from squeeze bottle 6 onto the adhesive layer 3 in the region of lip 22. Recovery of the inner member 1 is then effected by manually peeling off successive strips of the restraining means 2 between cracks 21A, if desired or necessary with further application of solvent to the adhesive in the region of peeling. FIGS. 4A to 4E are cross-sections through an intermediate point of the assembly as the strips are removed. For ease of illustration, adhesive layer 3 and mastic layer 4 are not shown in FIGS. 4A to 4E.

Figure 5:
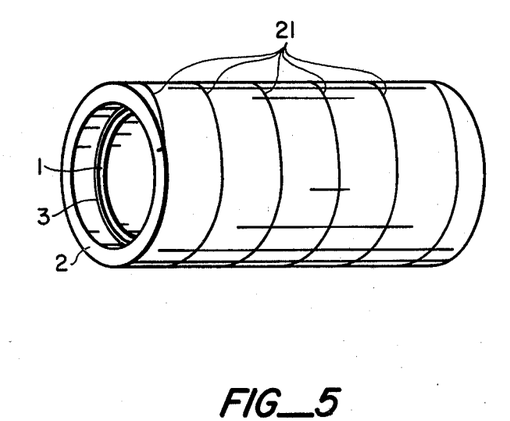
FIG. 5 is an isometric view of another article of the invention.

FIG. 5 illustrates another article of the invention which is similar to that shown in FIG. 1 but which comprises a single score line which runs spirally around the restraining means.

Figure 7:
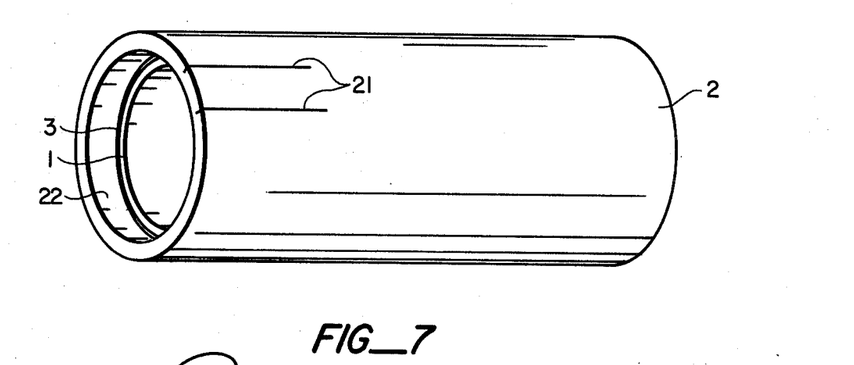
FIG. 7 is an isometric view of another article of the invention.
Figure 8:
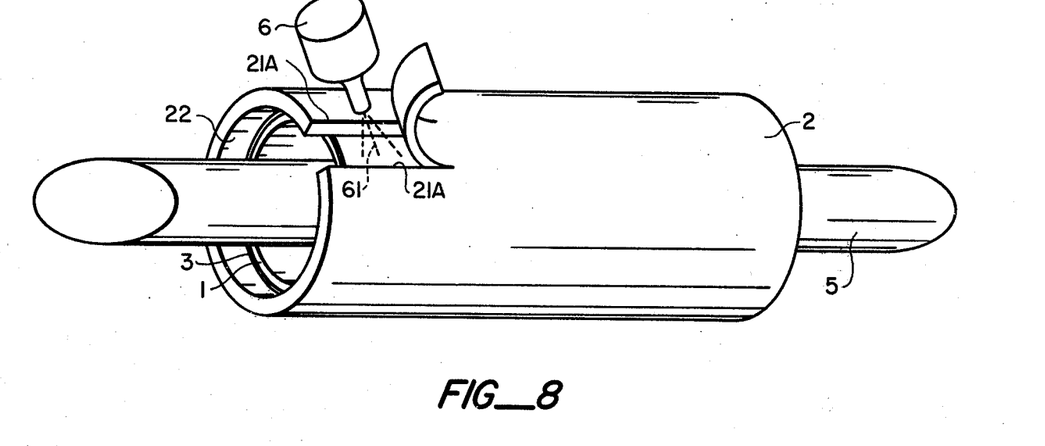
FIG. 8 is an isometric view of a stage in the recovery of the article of FIG. 7 around a substrate.

FIG. 7 illustrates another article of the invention which is similar to that shown in FIG. 1 but which comprises a pair of short score lines which define a pull tab which is used to create an area which acts as a reservoir for solvent which is applied to the bond line between the inner member and the restraining means, as shown in FIG. 8, and which percolates between the inner member and the restraining means.

Figure 9:
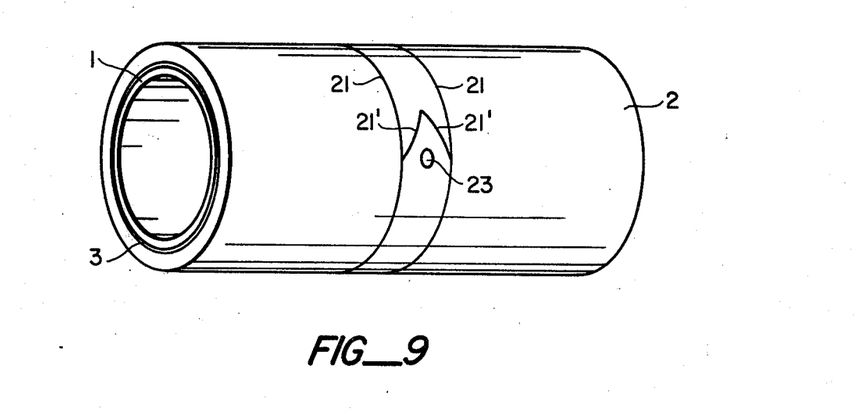
FIG. 9 is an isometric view of another article of the invention.

FIG. 9 illustrates another article of the invention which comprises a pair of circumferential score lines 21 at the mid point of the article and a V-shaped score line 21' between the score lines 21. Pull tab 23 is moulded or bonded to restraining means 2 at the open end of V-shaped score line 21' between the score lines 21. Pull tab 23 is moulded or bonded to restraining means 2 at the open end of V-shaped score line 21'. After the score lines 21 and 21' have been cracked open, the pull tab 23 is pulled outwards and around the article, thus peeling off the strip of the restraining means defined by lines 21, if desired with the aid of a solvent. Solvent is then applied to the exposed bond line at the edges of the exposed portion of the inner member, and percolates between the inner member and the restraining means.

The invention is further illustrated by the following Examples, in which parts, ratios and percentages are by weight.

EXAMPLE 1

Part A

The ingredients shown in Table A were blended together in a Banbury mixer.

TABLE A

| Ingredient | Parts |
|---|---|
| Polychloroprene (Neoprene TRT) | 100 |
| Antioxidant (Agerite Stalite S) | 2 |
| Magnesium oxide (Maglite D) | 2 |
| Carbon black (Vulcan 3) | 5 |
| Alumina trihydrate (Hydral 705) | 10 |
| Silica (HiSil 233) | 15 |
| Antimony trioxide | 15 |
| Stearic Acid | 0.5 |
| Plasticiser (Flexol TOF) | 4 |
| ZnO (Kadox 15) | 5 |
| Curing Agent (Thiate E) | 0.75 |
| Curing Agent (Epon 828) | 1 |

The blend was molded at about 175° C. for about 10 minutes into an elastomeric tube having a thickness of about 0.125 inch, an internal diameter of about 0.75 inch and a length of about 17 inch (Tube A).

Part B

The ingredients shown in Table B were blended together in a Banbury mixer.

TABLE B

| Ingredient | Parts |
|---|---|
| Block copolymer of polytetramethylene ether and polytetramethylene terephthalate (Hytrel 4056) | 70 |
| Ethylene/vinyl acetate (18%) copolymer (Alathon 3170) | 30 |
| Antioxidant (Irganox 1010) | 0.1 |
| Chalk filler (Vicron 15—15) | 125 |

TABLE B-continued

| Ingredient | Parts |
|---|---|
| Pigment (Wilson 50-OR-18) | 2.5 |

The blend was extruded into a tube having a thickness of about 0.085 inch±0.005 inch, an internal diameter of about 1.5 inch±0.020 inch, and cut into lengths of about 18 inch (Tube B)

Part C

The outer surface of Tube A was coated with a 1% solution of a 60/40 mixture of Hytrel 4056 and Dyvax 772 in methylene chloride. The inner surface of Tube B was abraded by passing the tube over a rotary abrasion wheel and then coated with a 10% solution of a 60/40 mixture of Hytrel 4056 and Dyvax 772 in methylene chloride. (Dyvax 772 is a block copolymer which is substantially the same as Hytrel 4056 but of lower melting point). After evaporation of all the methylene chloride, Tube A was heated to about 165° C. and immediately placed over an expansible mandrel. Without delay, Tube B, which was not preheated, was placed symmetrically over Tube A. The mandrel was then expanded until Tube A had first contacted Tube B and then expanded Tube B by 5-10%. The whole assembly was then rapidly placed into water at about 20° C., where it was left for about 4 minutes. After the assembly had been removed from the water, the mandrel was contracted and withdrawn. Tube A and Tube B contracted until Tube B had returned to about its original configuration.

Part D

Longitudinal parallel score lines about 0.008 inch deep and about ½ inch apart were then made with a razor blade on the outer surface of Tube B, the score lines running from end to end, as shown in FIG. 1.

Part E

The article thus made was stored until it was required, end plugs being inserted to ensure that Tube A did not recover prematurely. When the time came to use the article, the end plugs were removed, and the article crushed, e.g. between the operator's hands or between his foot and the floor, to open up the score lines. The article was then placed over one of two mine cables which were to be spliced. The cables were spliced and the article positioned around the splice. A suitable solvent, i.e. a fluid which will substantially weaken the adhesive bond and which may be, but is not necessarily, a solvent for the adhesive, e.g. 1,1,1-trichloroethane, was applied to the bond line at one end of the article. Tube B was grasped by the operator in the region to which solvent had been applied and was pulled away from the splice. Tube B tore along the adjacent score lines, so that a longitudinal strip of Tube B could be peeled away; further solvent was applied to help in the peeling process. Successive strips of Tube B were removed in the same way until Tube A had completely recovered and Tube B had been completely removed.

EXAMPLE 2

Parts A, B and C

The procedure of Parts A, B and C of Example 1 was followed to prepare an article comprising expanded Tube A secured to Tube B.

Part D

Two parallel, longitudinal score lines, about 0.5 inch apart and each about 1 inch long, were made with a razor blade at one end of the article, as shown in FIG. 7. The score lines were about 0.050 inch deep.

Part E

The article thus made was stored until it was required, end plugs being inserted to ensure that Tube A did not recover. When the time came to use the article, the end plugs were removed, and the end of the article bearing the score lines was crushed to open up the score lines. The article was then placed over one of two mine cables which were to be spliced. The cables were spliced and the article positioned around the splice. The spliced cables and the article were then placed so that the article was at an angle of 15°-30° to the horizontal, with the score lines at the top. A solvent was applied to the bond line in the area of the score lines and the region of Tube B defined by the score lines was grasped by the operator and pulled away from the splice, thus creating a pocket into which further solvent was placed. The solvent penetrated between Tube A and Tube B, and this process was accelerated by the operator kneading the article between his hands. After about 1.5 to 2.5 minutes, the penetration of the solvent had weakened the bond between Tubes A and B sufficiently to cause separation of Tube A from Tube B so that it recovered around the splice. Tube B was then scored from end to end with a razor blade or knife; the score line was opened up by crushing the tube along the score line; and the tube ripped open with a knife or by hand.

The articles prepared in Steps A to D of Examples 1 and 2 had the following properties.

| | |
|---|---|
| Tensile stress at 100% elongation of Tube A | 175-250 psi |
| Peel Strength of Bond between Tubes A and B | 7-12 pli |
| 2% Secant Modulus of Tube B at 21° C. | 20,000 psi |
| Ultimate Elongation of Tube B at 21° C. | 79-85% |
| % Torn Depth of Tube B | 50-60% |

EXAMPLE 3

The procedure of Example 1 was followed except that Tube A was made from the ingredients set out in Table C below.

TABLE D

| Ingredient | Parts |
|---|---|
| Polychloroprene (Neoprene GW) | 100 |
| Magnesium Oxide (Maglite D) | 1.5 |
| Silica (Hi Sil 233) | 35 |
| Silane A189 | 0.5 |
| Stearic acid | 0.6 |
| Antioxidant (Octamine) | 1.3 |
| Antioxidant (Agerite DPPD) | 0.7 |
| Carbon Black (Thermax) | 5 |
| Polyethylene oxide glycol (Carbowax 4000) | 3 |
| Tricresyl phosphate (plasticiser) | 12.5 |

TABLE D-continued

| Ingredient | Parts |
| --- | --- |
| ZnO (Kadox 15) | 5 |

We claim:

1. A flexible, shrinkable, hollow article which comprises
(1) a hollow inner member which is composed of an elastomeric material and which is in a radially extended condition; and
(2) a hollow outer restraining means
   (a) whose inner surface is secured to the outer surface of said inner member and which maintains said inner member in said radially extended condition, said inner and outer surfaces being secured to each other by a bond whose peel strength is less than 50 lb. per linear inch width at 21° C.;
   (b) whose outer surface forms the outer surface of said article and is provided with at least one score line whose depth is 5 to 90% of the thickness of the restraining means; and
   (c) is composed of a material which
      (i) has a 2% secant modulus at 21° C. of 4,000 to 120,000 psi;
      (ii) has an ultimate elongation at 21° C. of at least 20% at a separation speed of 200% per minute and at most 150% at a separation speed of 2,000% per minute; and
      (iii) has a notch sensitivity such that by distorting the article so as to exert a bending moment about the axis of the score line, the depth of said score line can be substantially increased to provide at least one section of the restraining means which can be pulled away from the inner member.

2. An article according to claim 1 wherein said restraining means is composed of a material which has a 2% secant modulus at 21° C. of 15,000 to 100,000 psi.

3. An article according to claim 2 wherein said restraining means is composed of a material which has a 2% secant modulus of 15,000 to 40,000 psi.

4. An article according to claim 3 wherein said restraining means is composed of a material having a % Torn Depth of at least 50%.

5. An article according to claim 4 wherein the value of the term $$T - 0.002S + 0.054E + 0.54P \text{ is 10 to 60}$$

where T is the % Torn Depth, S is the 2% secant modulus at 21° C. in psi, E is the ultimate elongation at 21° C. and P is the peel strength at 21° C. in pli.

6. An article according to claim 5 wherein the value of said term is 15 to 35.

7. An article according to claim 2 wherein said restraining means is composed of a material which has an ultimate elongation at 21° C. of 35 to 120% at a separation speed of 200% per minute.

8. An article according to claim 7 wherein said restraining means is composed of a material which has an ultimate elongation at 21° C. of 50 to 100% at a separation speed of 200% per minute.

9. An article according to claim 7 wherein said restraining means is composed of a material having a % Torn Depth of at least 40%.

10. An article according to claim 1 wherein said restraining means is composed of a material having a % Torn Depth of at least 40%.

11. An article according to claim 1 wherein the peel strength of said bond at 21° C. is 5 to 25 pli.

12. An article according to claim 11 wherein the peel strength of said bond is 7 to 15 pli.

13. An article according to claim 1 wherein the value of the term $$T - 0.002S + 0.054E + 0.54P \text{ is 10 to 60}$$

where T is the % Torn Depth, S is the 2% secant modulus at 21° C. in psi and is less than 40,000 psi, E is the ultimate elongation at 21° C. and P is the peel strength at 21° C. in pli.

14. An article according to claim 13 wherein the value of said term is 15 to 35.

15. An article according to claim 1 wherein said restraining means is composed of a material which comprises a first polymer having a modulus greater than 20,000 psi and a second polymer having a modulus less than 10,000 psi, the ratio by weight of said first polymer to second polymer being 1.5:1 to 4:1.

16. An article according to claim 1 wherein said restraining means is composed of a material which comprises 25 to 75% by weight of a particulate filler.

17. An article according to claim 1 wherein the peel strength of said bond at 49° C. is at least 4 pli and the restraining means is composed of a material which has a 2% secant modulus at 49° C. of at least 4,000 psi.

18. The article of claim 1 in which at least one score line is made by cutting into the outer surface of the restraining means.

19. The article of claim 1 in which the inner member is in the form of a tube.

20. The article of claim 19 in which the inner member has a circular cross section.

21. A flexible, shrinkable, hollow article which comprises
(1) a hollow inner member which is composed of an elastomeric material and which is in a radially extended condition; and
(2) a hollow outer restraining means
   (a) whose inner surface is secured to the outer surface of said inner member through a layer of a hot melt adhesive and which maintains said inner member in said radially extended condition, said inner and outer surfaces being secured to each other by a bond whose peel strength is 4 to 30 pli at 21° C. and at least 4 pli at 49° C.;
   (b) whose outer surface forms the outer surface of said article and is provided with at least one score line whose depth is 5 to 75% of the thickness of the restraining means; and
   (c) is composed of a material which
      (i) comprises an organic polymer;
      (ii) has a 2% secant modulus of 15,000 to 100,000 psi at 21° C. and at least 4,000 psi at 49° C.;
      (iii) has an ultimate elongation at 21° C. of 35 to 120% at a separation speed of 200% per minute; and
      (iv) has a % Torn Depth of at least 40%.

22. An article according to claim 21 wherein said restraining means is composed of a material which has a 2% secant modulus of 15,000 to 40,000 psi at 21° C., an ultimate elongation of 50 to 100% at 21° C. at a separation speed of 200% per minute, and a % Torn Depth of at least 50%.

23. An article according to claim 22 wherein the value of the term $$T - 0.002S + 0.054E + 0.54P \text{ is } 10 \text{ to } 60$$

where T is the % Torn Depth, S is the 2% secant modulus at 21° C. in psi, E is the ultimate elongation at 21° C. and P is the peel strength at 21° C. in pli.

24. An article according to claim 23 wherein the value of said term is 15 to 35.

25. An article according to claim 21 which is in the form of a tube, the restraining means being longer than the inner member and at least one end of the restraining means forming an overlapping lip at one end of the article.

26. An article according to claim 25 which comprises at least two longitudinal score lines which extend to said end of the restraining means.

27. A method of covering a substrate which comprises
(A) distorting a flexible, shrinkable, hollow article which comprises
   (1) a hollow inner member which is composed of an elastomeric material and which is in a radially extended condition; and
   (2) a hollow outer restraining means
      (a) whose inner surface is secured to the outer surface of said inner member and which maintains said inner member in said radially extended condition, said inner and outer surfaces being secured to each other by a bond whose peel strength is 4 to 30 lbs. per linear inch width at 21° C.;
      (b) whose outer surface forms the outer surface of said article and is provided with at least one score line whose depth is 5 to 90% of the thickness of the restraining means; and
      (c) is composed of a material which
         (i) has a 2% secant modulus at 21° C. of 4,000 to 120,000 psi;
         (ii) has an ultimate elongation at 21° C. of at least 20% at a separation speed of 200% per minute and at most 150% at a separation speed of 2,000% per minute; and
         (iii) has a % Torn Depth of at least 40%;
said distorting substantially increasing the depth of at least one score line to provide at least one section of the restraining means which can be pulled away from the inner member;
(B) placing said article around said substrate; and
(C) peeling at least part of said outer restraining means away from said inner member to cause recovery of the inner member, said peeling being initiated by pulling away from said inner member a section of said restraining means adjacent said score line whose depth has been increased in Step (A).

28. A flexible, shrinkable, hollow article which comprises
(1) a flexible hollow inner member which is composed of an elastomeric material and which is in a radially extended condition; and
(2) a flexible hollow outer restraining means
   (a) whose inner surface is bonded to the outer surface of the inner member and which maintains the inner member in the radially extended condition, the inner and outer surface being bonded to each other by a bond whose peel strength is 7 to 15 lbs. per linear inch width at 21° C.;
   (b) whose outer surface is provided with at least one linear indentation whose depth is 50 to 90% of the thickness of the restraining means; and
   (c) is composed of a material which
      (i) has a notch sensitivity such that by distorting the article so as to exert a bending moment about the axis of such a linear indentation, the depth of such linear indentation can be substantially increased to provide at least one section of the restraining means which can be pulled away from the inner member; and
      (ii) has a 2% secant modulus at 21° C. of 15,000 to 40,000 psi and has an ultimate elongation at 21° C. of 50 to 100% at a separation speed of 20% per minute, wherein the material has sufficient flexibility that (a) the cross-section of the restraining means can be deformed without breaking the bond between the inner member and the restraining means and (b) such a pulled away section can bend through at least a 90° angle without cracking.

29. The article of claim 28 in which at least one linear indentation is made by cutting into the outer surface of the restraining means.

30. The article of claim 28 in which the inner member is in the form of a tube.

31. The article of claim 39 in which the inner member has a circular cross-section.

32. An article according to claim 28 wherein the value of the term $$T - 0.002S + 0.054E + 0.54P \text{ is } 10 \text{ to } 60,$$

where T is the % Torn Depth, S is the 2% secant modulus at 21° C. in psi, E is the ultimate elongation at 21° C. and P is the peel strength at 21° C. in pli.

33. An article according to claim 32 wherein the value of said term is 15 to 35.

34. An article according to claim 28 wherein said restraining means is composed of a material which comprises a first polymer having a modulus greater than 20,000 psi and a second polymer having a modulus less than 10,000 psi, the ratio by weight of said first polymer to second polymer being 1.5:1 to 4:1.

35. An article according to claim 28 wherein said restraining means is composed of a material which comprises 25 to 75% by weight of a particulate filler.

36. A method of covering a substrate which comprises
(A) distorting a flexible, shrinkable hollow article as claimed in claim 28,
(B) placing the article around the substrate; and
(C) pulling away from the inner member a section of the restraining means adjacent a linear indentation whose depth has been increased by the step of distorting for recovery of the inner member toward the substrate.

37. The method of claim 36 in which the step of distorting takes place before the step of placing.

38. The method of claim 36 in which the step of pulling away comprises applying solvent to the bond between the inner member and the outer restraining means.

39. The article of claim 1 or 28 in which the inner member, when fully recovered, has a thickness of from 0.02 to 0.5 inch.

40. The article of claim 39 in which the inner member, when fully recovered, has a thickness of from 0.02 to 0.25 inch.

41. The article of claim 40 in which the inner member, when fully recovered, has a thickness of from 0.05 to 0.15 inch.

42. The article of claim 1 or 28 in which the inner member, when fully recovered, has an internal diameter of from 0.1 to 3 inches.

43. The article of claim 42 in which the inner member, when fully recovered, has an internal diameter of from 0.4 to 2 inches.

44. The article of claim 1 or 28 in which the inner member, in the extended state, has an internal diameter of from 0.125 to 4 inches.

45. The article of claim 44 in which the inner member, in the extended state, has an internal diameter of from 0.75 to 3 inches.

46. The article of claim 45 in which the inner member has an extension ratio of 1.7:1 to 2.3:1.

47. The article of claim 1 or 28 in which the inner member has an extension ratio of 1.3:1 to 3:1.

48. A method of covering a substrate which comprises
(A) distorting a flexible, shrinkable hollow article as claimed in any of claims 1, 11, 15, 18, 19, 22, 23, 25, 26 or 27;
(B) placing the article around the substrate; and
(C) pulling away from the inner member a section of the restraining means adjacent a score line whose depth has been increased by the step of distorting for recovery of the inner member toward the substrate.

49. The method of claim 48 in which the step of distorting takes place before the step of placing.

50. The method of claim 48 in which the step of pulling away comprises applying solvent to the bond between the inner member and the outer restraining means.

* * * * *